Patented Sept. 30, 1924.

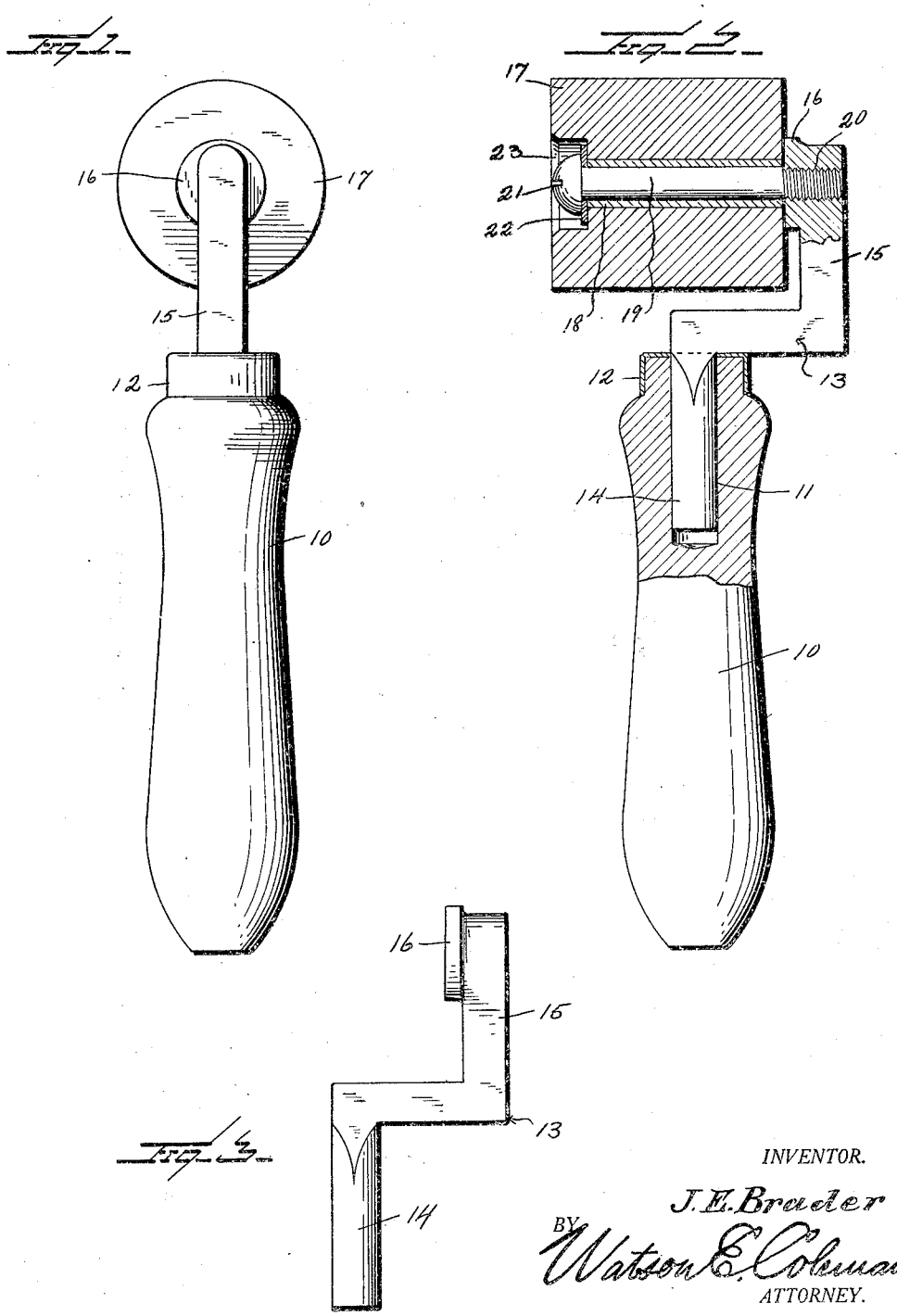

1,510,034

UNITED STATES PATENT OFFICE.

JAMES EDWARD BRADER, OF BETHLEHEM, PENNSYLVANIA.

PAPER HANGER'S SEAM ROLLER.

Application filed March 11, 1924. Serial No. 698,455.

*To all whom it may concern:*

Be it known that I, JAMES EDWARD BRADER, a citizen of the United States, residing at Bethlehem, in the county of Northampton and State of Pennsylvania, have invented certain new and useful Improvements in Paper Hangers' Seam Rollers, of which the following is a specification, reference being had to the accompanying drawings.

This invention relates to wall paper rollers such as are used in pressing the seams of wall paper and the particular object of the invention is to provide a wall paper roller which can be used very closely adjacent the side wall in case the paper comes to this point or may be used in cramped quarters.

A further object is to provide a wall paper roller of this character which is mounted upon a sleeve bearing so that the roller may rotate very readily and easily.

My invention is illustrated in the accompanying drawings wherein:—

Figure 1 is a side elevation of the roller constructed in accordance with my invention;

Figure 2 is a sectional view thereof, and

Figure 3 is an elevation of a shank of the roller.

Referring to these drawings, 10 designates the handle which is provided with a bore 11 and a ferrule 12. The shank 13 is angular in form to provide a portion 14 which extends down into the bore 11 and is held snugly therein. The shank beyond this portion 14 is angularly bent at right angles to the axis of the handle and then extends longitudinally as at 15, this longitudinal portion being formed upon its inner surface with a circular bearing face 16 and being internally screw threaded. The roller 17 which may be made of wood, composition or other suitable material, is mounted upon a bearing sleeve or bushing 18 which has rotatable engagement with a pin 19. This pin is screw threaded for insertion in the screw threads of the shank as at 20 and at its outer end is provided with a nicked head 21. Upon the head 21 and the bearing sleeve is disposed the washer 22. One end of the roller is countersunk as at 23 to receive this head and a washer. The use of this device will be obvious but the particular advantage of the device lies in the fact that the roller is supported entirely at one end and projects quite a little distance beyond the handle on the unsupported ends so that this portion of the roller may be brought up into the corner of the wall and may be used in forcing the paper into close contact with the wall at such points as this. Obviously the roller may also be used, however, for rolling down or pressing the ordinary seams between the sheets of wall paper.

What I claim is:—

A seam roller of the character described comprising a handle, an angularly bent shank extending from the handle on one side thereof, a pin having screw threaded engagement with the shank and intersecting the axis of the handle and having a head at its outer end, a sleeve surrounding the pin and a roller mounted upon the sleeve, the roller being countersunk at one end to receive said head.

In testimony whereof I hereunto affix my signature.

JAMES E. BRADER.